US008427699B2

(12) United States Patent
Tanaka

(10) Patent No.: US 8,427,699 B2
(45) Date of Patent: Apr. 23, 2013

(54) IMAGE FORMING APPARATUS WITH TINT BLOCK DETECTOR

(75) Inventor: Kunihiko Tanaka, Osaka (JP)

(73) Assignee: Kyocera Mita Corporation (JP)

( * ) Notice: Subject to any disclaimer, the term of this patent is extended or adjusted under 35 U.S.C. 154(b) by 593 days.

(21) Appl. No.: 12/699,351

(22) Filed: Feb. 3, 2010

(65) Prior Publication Data

US 2010/0195128 A1 Aug. 5, 2010

(30) Foreign Application Priority Data

Feb. 5, 2009 (JP) .................................. 2009-024641
Jan. 20, 2010 (JP) .................................... 2010-9936

(51) Int. Cl.
*G06K 15/02* (2006.01)
*G06F 17/3025* (2006.01)

(52) U.S. Cl.
USPC ........... 358/1.9; 358/1.2; 358/3.24; 358/1.13; 358/1.14; 358/3.27; 358/514; 358/518; 358/448; 358/461; 358/3.28; 382/100; 382/162; 382/165; 382/199; 382/237; 382/251; 382/274; 400/62; 400/63; 400/74

(58) Field of Classification Search .......................... None
See application file for complete search history.

(56) References Cited

U.S. PATENT DOCUMENTS

| 7,131,775 | B2* | 11/2006 | Uchida et al. .................... 400/62 |
| 7,190,829 | B2* | 3/2007 | Zhang et al. ................... 382/165 |
| 7,474,439 | B2* | 1/2009 | Uchida et al. .................. 358/1.9 |
| 8,194,263 | B2* | 6/2012 | Aritomi et al. ............... 358/1.14 |
| 2003/0156298 | A1* | 8/2003 | Matsuyama et al. ........... 358/1.1 |
| 2003/0179399 | A1 | 9/2003 | Matsunoshita |
| 2005/0078331 | A1 | 4/2005 | Guan et al. |
| 2007/0091350 | A1* | 4/2007 | Aritomi et al. ............... 358/1.14 |
| 2008/0273746 | A1 | 11/2008 | Minamino |
| 2009/0185225 | A1* | 7/2009 | Kobayashi .................. 358/1.18 |
| 2009/0185226 | A1* | 7/2009 | Kobayashi .................. 358/1.18 |

FOREIGN PATENT DOCUMENTS

| JP | 2001-197297 | 7/2001 |
| JP | 2007166509 | 6/2007 |
| JP | 2008154106 | 7/2008 |
| JP | 2008268620 | 11/2008 |

* cited by examiner

*Primary Examiner* — Steven Kau
(74) *Attorney, Agent, or Firm* — Gerald E. Hespos; Michael J. Porco; Matthew T. Hespos

(57) ABSTRACT

An image formation controller judges whether or not a tint block has been detected by a tint block processor upon judging that an automatic color determination mode is set in a multi functional peripheral. The image formation controller causes an image forming section to perform a monochromatic image forming operation if the tint block is a chromatic tint block when the tint block was detected by the tint block processor. On the other hand, the image formation controller causes the image forming section to perform an image forming operation corresponding to a determination result by an ACS processor when no tint block was detected and when the tint block was determined to be a monochromatic tint block.

2 Claims, 12 Drawing Sheets

FIG.8

| COLOR OF EMBEDDED PATTERN OF DOCUMENT | R | G | B |
|---|---|---|---|
| BLACK | SMALL | SMALL | SMALL |
| RED | LARGE | SMALL | SMALL |
| GREEN | SMALL | LARGE | SMALL |
| BLUE | SMALL | SMALL | LARGE |
| CYAN | SMALL | LARGE | LARGE |
| MAGENTA | LARGE | SMALL | LARGE |
| YELLOW | LARGE | LARGE | SMALL |

FIG.9

| COLOR EMBEDDED PATTERN DATA DETECTION RESULT | | | EMBEDDED PATTERN DETECTION RESULT | CHROMATIC EMBEDDED PATTERN DETECTION RESULT |
|---|---|---|---|---|
| R | G | B | | |
| 1 | 1 | 1 | 1 | 0 |
| 0 | 1 | 1 | 1 | 1 |
| 1 | 0 | 1 | 1 | 1 |
| 1 | 1 | 0 | 1 | 1 |
| 1 | 0 | 0 | 1 | 1 |
| 0 | 1 | 0 | 1 | 1 |
| 0 | 0 | 1 | 1 | 1 |
| 0 | 0 | 0 | 0 | - |
| 1: COULD BE DETECTED 0: COULD NOT BE DETECTED | | | 1: COULD BE DETECTED 0: COULD NOT BE DETECTED | 1: CHROMATIC EMBEDDED PATTERN 0: MONOCHROMATIC EMBEDDED PATTERN |

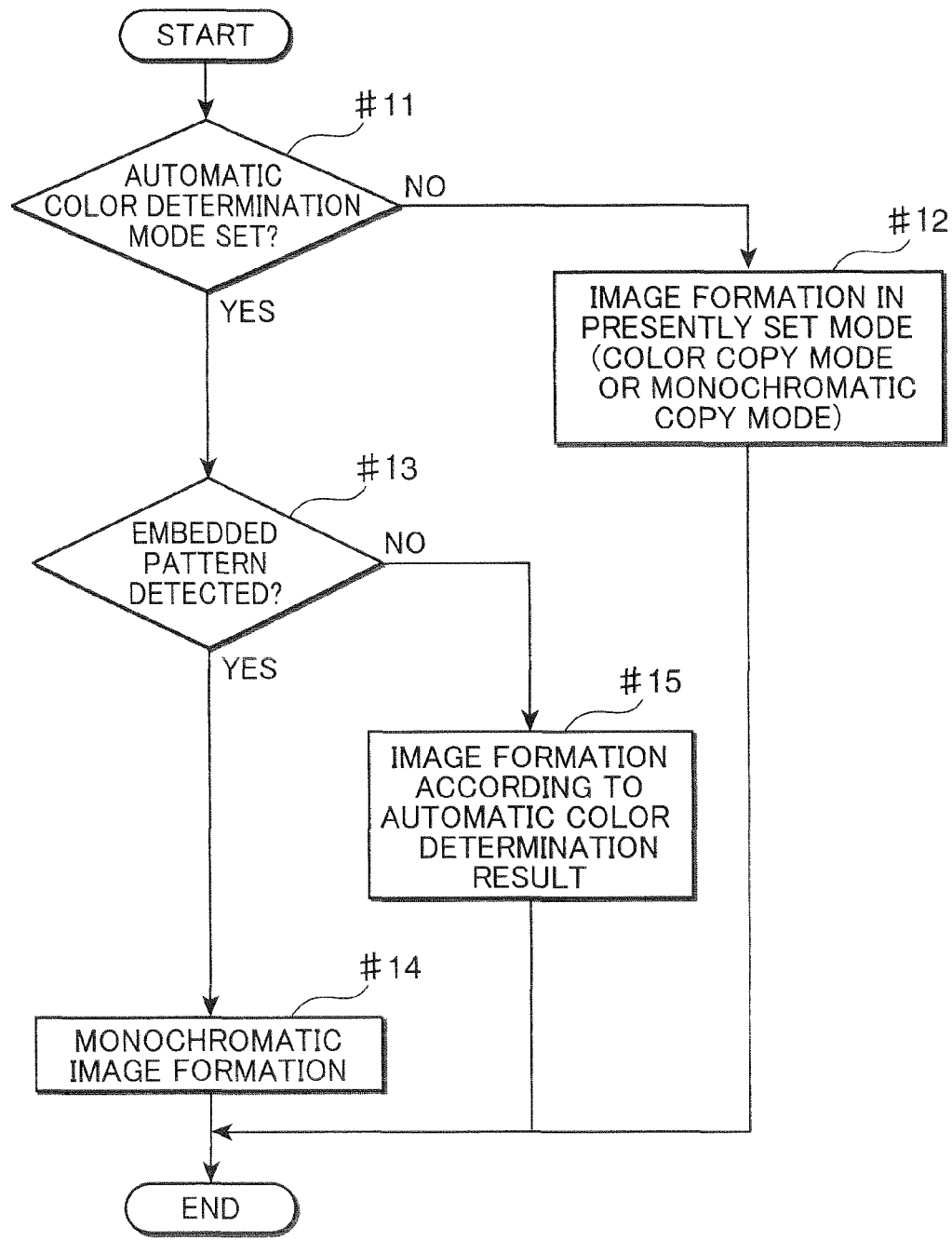

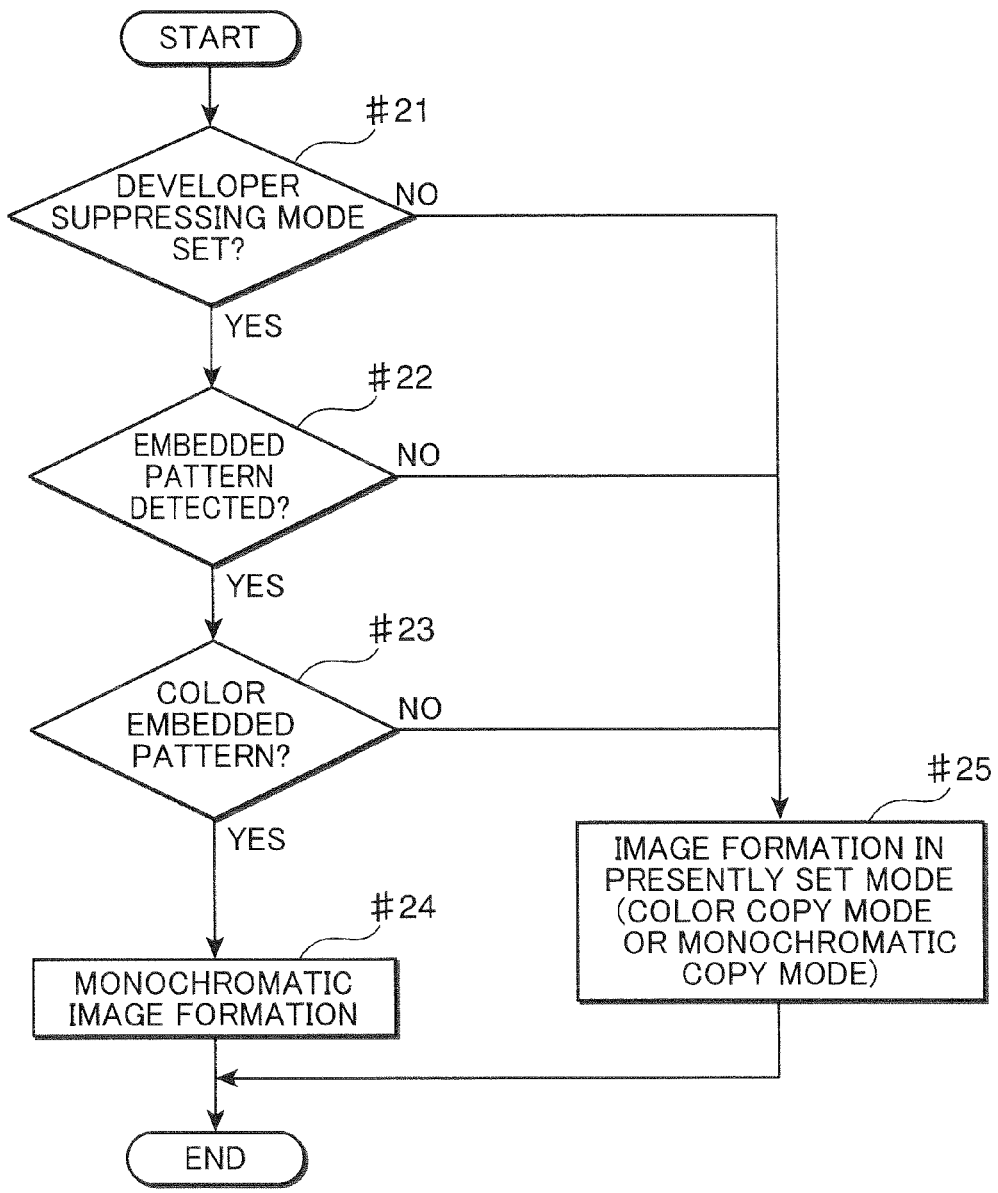

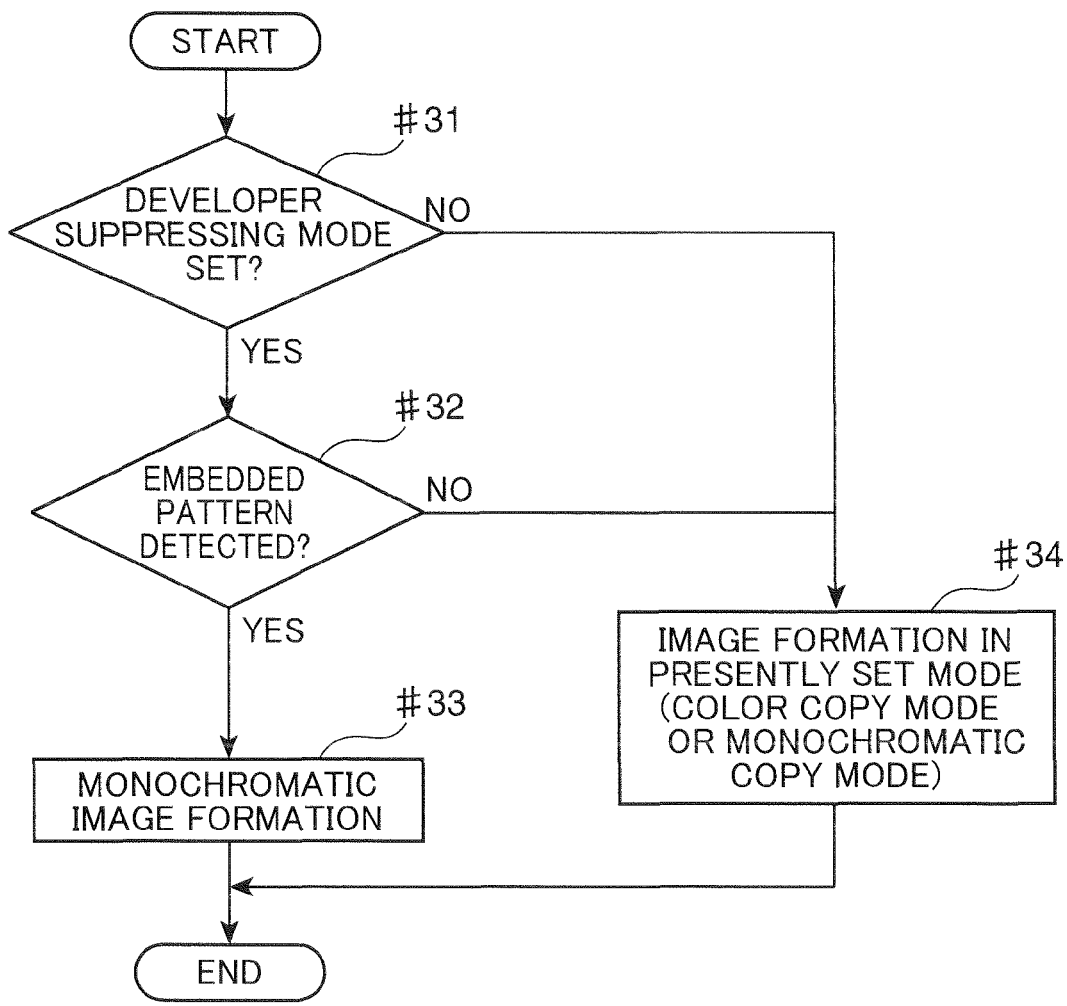

IMAGE FORMING APPARATUS WITH TINT BLOCK DETECTOR

BACKGROUND OF THE INVENTION

1. Field of the Invention

The present invention relates to a technological field of image forming apparatuses, particularly to a process in the case of a document formed with a tint block.

2. Description of the Related Art

There have been conventionally proposed various technologies for preventing or inhibiting copying and duplication of confidential documents needed to be kept confidential such as data including confidential information of companies or utilization of copied media. One of these technologies is a tint block printing technology for a tint block including a background part formed by a certain number of screen lines and a latent image part formed by a larger number of screen lines (halftone dot density) than the former screen lines in a document image.

If a document image generated using this tint block printing technology is copied, an area corresponding to the latent image part of the document image becomes white in the copied media, wherefore a pattern such as a "Copying Prohibited" visually comes up to be seen. This can psychologically restrict or inhibit the copying of the document.

On the other hand, there is a widely known technology, separately from the above tint block printing technology, for reading a document image, detecting a special dot pattern embedded in a background image included in an image data obtained by the reading, comparing the detected special dot pattern with a special dot pattern stored beforehand and prohibiting an image forming operation on a sheet if the both patterns coincide.

There is also known an image forming apparatus (1) for prohibiting a copying operation by detecting a pattern image indicating a copy prohibit code using a copy prohibit information detector when such a pattern image is included in a document image read by an image reader while printing the read image on a sheet when the pattern image indicating the copy prohibit code is not included and (2) for detecting a pattern image indicating a condition code using a condition information detector when such a pattern image is included in a document image read by the image reader, permitting the copying operation only when the detected pattern image agrees with a specified condition registered beforehand while outputting the read image on a sheet when the pattern image indicating the condition code is not included.

In recent years, there has been also known a technology for forming a chromatic tint block on a document and, using this technology, chromatic tint blocks are formed on documents in some cases. Here, there has been a room for reducing the consumption of developers (toners) in the case of copying a document of this type.

SUMMARY OF THE INVENTION

The present invention is a further improvement of the above conventional technologies.

Specifically, the present invention is directed to an image forming apparatus, comprising: an image reader reads an image of a document, a tint block detector detects whether or not a tint block is formed on the document based on image data obtained by a reading operation of the image reader, an image forming section including a plurality of developers and adapted to form an image on a recording medium using one or more of the developers based on the image data, and an image formation controller causes the image forming section to perform a monochromatic image forming operation using a single developer as an image forming operation relating to the tint block when the tint block was detected by the tint block detector.

Objects, features and advantages of the present invention will become more apparent upon a reading of the following detailed description. Further, advantages of the present invention will become more apparent in the following description with reference to accompanying drawings.

BRIEF DESCRIPTION OF THE DRAWINGS

FIG. 8 is a table showing magnitude relations of pixel values indicated by respective image data of R (red), G (green) and B (blue) and threshold values for each color of a tint block formed on a document, FIG. 9 is a table showing a relationship of the presence or absence of tint block data of each color component, the presence or absence of a tint block on a document (no distinction is made between a chromatic tint block and a monochromatic tint block) and the presence or absence of a chromatic tint block on the document, FIG. 11 is a flow chart showing a modification of the process by the control unit, FIG. 12 is a flow chart showing another modification of the process by the control unit, and FIG. 13 is a flow chart showing still another modification of the process by the control unit.

DETAILED DESCRIPTION OF THE PREFERRED EMBODIMENTS

Figure 1:
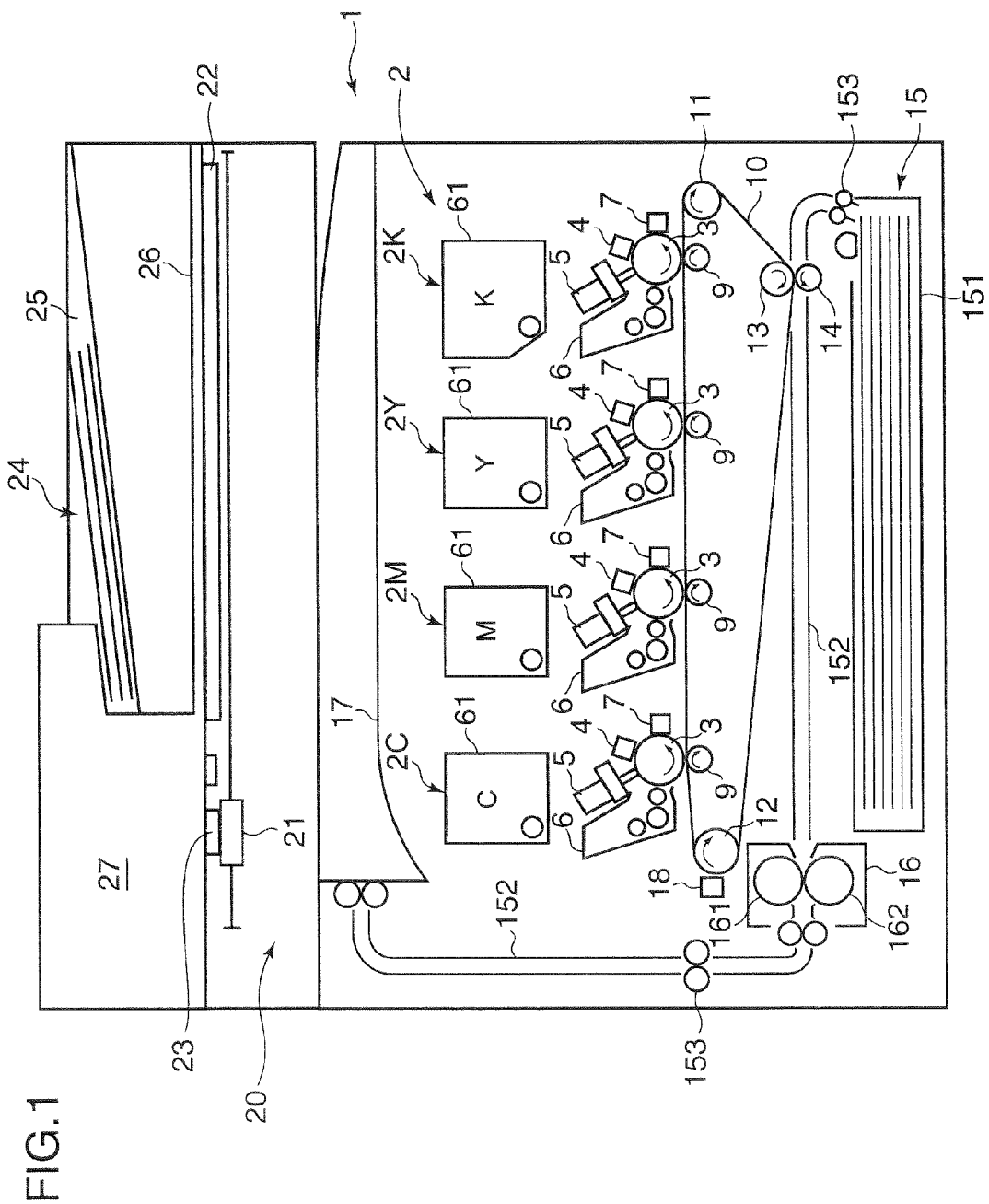
FIG. 1 is a schematic construction diagram of a multi functional peripheral according to one embodiment of the invention.

Hereinafter, a multi functional peripheral as one embodiment of an image forming apparatus according to the present invention is described with reference to the drawings. FIG. 1 is a schematic construction diagram of a multi functional peripheral according to one embodiment of the present invention.

As shown in FIG. 1, image forming units 2C, 2M, 2Y and 2K (these are collectively called an image forming section 2) of separate colors of C (cyan), M (magenta), Y (yellow) and K (black) are arranged side by side in a body of the multi functional peripheral 1.

The image forming section 2 is for forming (printing) a color image on a sheet, and each of the image forming units 2M, 2C, 2Y and 2K includes a photoconductive drum 3 made of, e.g. an amorphous silicon, and a charger 4, an exposing device 5, a developing device 6 and a photoconductive drum cleaner 7 arranged around the photoconductive drum 3.

The charger 4 is for uniformly charging the entire surface of the photoconductive drum 3 to a specified potential. The exposing device 5 irradiates the surface of the photoconductive drum 3 with LED light generated based on image data transmitted from an image data storage 40 (see FIG. 2) to be described later, thereby forming an electrostatic latent image on the surface of the photoconductive drum 3.

The developing device 6 is for developing the electrostatic latent image into a visible image by developing the electrostatic latent image formed on the photoconductive drum 3 with a developer supplied from a developer feeder 61. The photoconductive drum cleaner 7 is for removing the developer remaining on the surface of the photoconductive drum 3 without being transferred to an intermediate belt 10 to be described later after the completion of a primary transfer to the intermediate belt 10.

Intermediate transfer rollers 9 (primary transfer rollers) for the intermediate transfer (primary transfer) of visible images developed on the surfaces of the photoconductive drums 3 and the intermediate belt (intermediate transfer belt) 10 are arranged below the image forming units 2M to 2K. The intermediate belt 10 is made of a specified belt body and endlessly rotated by a drive roller 11 while being pressed against the photoconductive drums 3 by the intermediate transfer rollers 9 arranged to face the respective photoconductive drums 3. The intermediate belt 10 is wind around the drive roller 11, a driven roller 12 and a tension roller 13. The driven roller 12 and the tension roller 13 are driven and rotated upon receiving a driving force of the drive roller 11 via the intermediate belt 10. The tension roller 13 applies a suitable tensile force to the intermediate belt 10 lest the intermediate belt 10 should loosen.

The visible images of the respective colors formed on the photoconductive drums 3 are respectively superimposed on the endlessly rotated intermediate belt 10 in the order of cyan, magenta, yellow and black in a timed manner by the action of primary transfer biases applied to the intermediate transfer rollers 9. In this way, a color image made of four colors of C, M, Y and K is formed on the intermediate belt 10.

A secondary transfer roller 14 is disposed at a position facing the tension roller 13 via the intermediate belt 10. A secondary transfer bias is applied to the secondary transfer roller 14 and the color image on the intermediate belt 10 is transferred to a sheet (an example of recording medium) by the action of this secondary transfer bias.

The multi functional peripheral 1 is also provided with a sheet feeder 15 for feeding a sheet toward the image forming units 2C, 2M, 2Y and 2K. The sheet feeder 15 includes a sheet cassette 151 for accommodating sheets, a conveyance path 152 as a path for conveying sheets, conveyor rollers 153 for conveying a sheet in the conveyance path 152 and the like and conveys sheets fed one by one from the sheet cassette 151 toward a secondary transfer nip between the secondary transfer roller 14 and the tension roller 13. The sheet feeder 15 also conveys the sheet after a secondary transfer process to a fixing unit 16 and discharges the sheet after a fixing process to a sheet discharge tray 17 provided in an upper part of a main body of the multi functional peripheral 1.

The fixing unit 16 is provided at a suitable position downstream of the secondary transfer roller 14 in the conveyance path 152. The fixing unit 16 is for fixing a visible image transferred to a sheet. The fixing unit 16 includes a heat roller 161 and a pressure roller 162, melts the developer on the sheet by the heat of the heat roller 161 and fixes the developer to the sheet by pressure from the pressure roller 162.

The multi functional peripheral 1 is also provided with a neutralizing cleaner 18. The neutralizing cleaner 18 is for removing (collecting) the developer remaining on the intermediate belt 10. The neutralizing cleaner 18 includes unillustrated cleaning electrode and cleaning brush (rotary brush) and removes the developer by applying a cleaning bias having a polarity opposite to electrification charges of the developer to the cleaning brush using the cleaning electrode and transferring the developer on the intermediate belt 10 to the cleaning brush by a resulting electrostatic force.

A document reader 20 and a document feeder 24 are arranged atop the main body of the multi functional peripheral 1. The document reader 20 is provided with a scanner unit 21 including an exposure lamp and a plurality of reflection mirrors, a document platen 22 made of a transparent member such as glass, a document reading slit 23 made of a transparent member such as glass, and a CCD (Charge Coupled Device) sensor.

The CCD sensor is, for example, a line sensor constructed such that, for example, three photoelectric conversion element rows each made up of a plurality of photoelectric conversion elements arranged in a main scanning direction are arranged in a sub scanning direction, filters of R (red) are arranged in one row, those of G (green) are arranged in another row and those of B (blue) are arranged in still another row. In the following description, three photoelectric conversion elements having the filters of R (red), G (green) and B (blue) respectively arranged therefor and aligned in the sub scanning direction is called one pixel. At this time, image data of the respective color components of R (red), G (green) and B (blue) are respectively output from one pixel. A color system comprised of the respective color components of R (red), G (green) and B (blue) is an example of a predetermined color system.

The scanner unit 21 is formed to be movable by an unillustrated driver. Upon reading a document placed on the document platen 22, the scanner unit 21 is moved along a document surface at a position facing the document platen 22 and outputs the obtained image data to a control unit 33 (see FIG. 2) while scanning a document image. Further, upon reading a document fed by the document feeder 24, the scanner unit 21 is moved to a position facing the document reading slit 23, obtains a document image in synchronism with a document feeding operation by the document feeder 24 via the document reading slit 23 and outputs this image data to the control unit 33.

The document feeder 24 includes a document placing portion 25, on which documents are to be placed, a document discharging portion 26, onto which documents having images thereof read are to be discharged, and a document conveying mechanism 27 including a feed roller, conveyor rollers (not shown) and the like for feeding documents placed on the document placing portion 25 one by one, conveying them to the position facing the document reading slit 23 and discharging the document to the document discharging portion 26. The document conveying mechanism 27 further includes a sheet reversing mechanism (not shown) for reversing a document upside down and conveying the document to the position facing the document reading slit 23 again, so that images on both sides of the document can be read by the scanner unit 21 via the document reading slit 23.

The document feeder 24 is so arranged rotatably with respect to the scanner unit 21 that the front side thereof is upwardly movable. By exposing the upper surface of the document platen 22 by moving the front side of the document feeder 24 upward, a user can place a document to be read, e.g. an opened book on the upper surface of the document platen 22.

Figure 2:
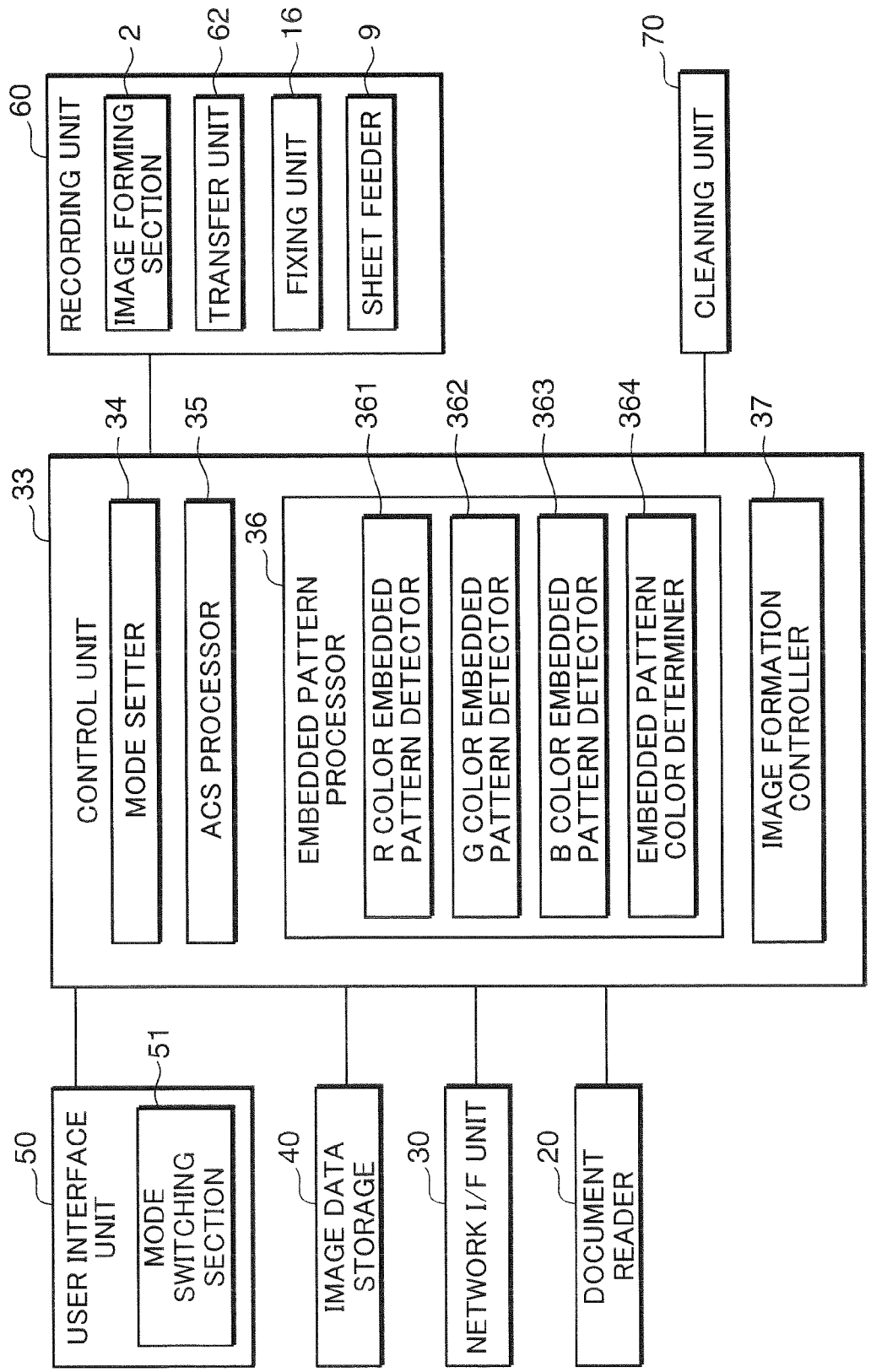
FIG. 2 is a block diagram showing the electrical construction of the multi functional peripheral.

FIG. 2 is a block diagram showing an exemplary electrical construction of the multi functional peripheral 1. As shown in FIG. 2, the multi functional peripheral 1 is provided with a network I/F (interface) unit 30, an image data storage 40, a user interface unit 50, a recording unit 60, a cleaning unit 70 and the control unit 33.

The network I/F unit 30 is for controlling the transmission and reception of various data to and from an information processor (external apparatus) such as a PC connected via a network such as a LAN. The image data storage 40 is for temporarily storing image data transmitted from a PC or the like via the network I/F unit 30.

The user interface unit 50 is arranged in a front part of the multi functional peripheral 1, functions as input keys used by the user to input various instructions and displays specified information. The multi functional peripheral 1 of this embodiment has, as operation modes, a color copy mode for copying a document using at least two of the respective developers of C (cyan), M (magenta), Y (yellow) and K (black), a monochromatic copy mode for copying a document using only the developer of K (black) and an automatic color determination mode for determining whether a document is a color document or a monochromatic document by an ACS processor 35 to be described later (automatically determined in the apparatus) and performing an image forming operation corresponding to the determination result, and the user interface unit 50 includes a mode switching section 51 for switching the mode among these modes.

When an operation is performed to the mode switching section 51 to switch the operation mode, mode information indicating an operation mode switching instruction designated by the user is output from the mode switching section 51 to the control unit 33. Thus, the control unit 33 switches the image forming mode of the multi functional peripheral 1 to the operation mode designated by the user.

The recording unit 60 includes the above image forming section 2, a transfer unit 62, the fixing unit 16 and the sheet feeder 9 and prints an image on a sheet based on image data, for example, stored in the image data storage 40. The transfer unit 62 includes the above intermediate belt 10, a driving roller 11, a driven roller 12, and a tension roller 13 and secondary transfer roller 14 and the like and transfers visible images on the photoconductive drums 3 to a sheet via the intermediate belt 10.

The cleaning unit 70 includes the above neutralizing cleaner 18 (also includes the photoconductive drum cleaners 7).

The control unit 33 includes a ROM (Read Only Memory) for storing various control programs, a RAM (Random Access Memory) having a function of temporarily storing data and a function as a work area, and a microcomputer for reading the control programs and the like from the ROM and executing them. The control unit 33 governs an operation control of the entire multi functional peripheral 1 by transmitting various control signals to the above respective functional elements and receiving signals relating to operating conditions and the like from the respective functional elements.

The control unit 33 includes a mode setter 34, the ACS processor 35, a tint block processor 36 and an image formation controller 37. In this embodiment, the respective processes are described, assuming a case where a tint block is formed in a background area of an image formed by the black developer on a document.

The mode setter 34 is for setting the operation mode of the multi functional peripheral 1 to the one indicated by the mode information received from the mode switching section 51 out of the color copy mode, the monochromatic copy mode and the automatic color determination mode.

The ACS processor (first determiner, second determiner) 35 is for automatically determining whether or not a document read by the document reader 20 is a color document (whether or not the entire image formed on the document is a color image using at least one chromatic color) by an ACS (Auto Color Selection) process. Examples of the ACS process are shown in FIGS. 3 to 5.

Figure 3:
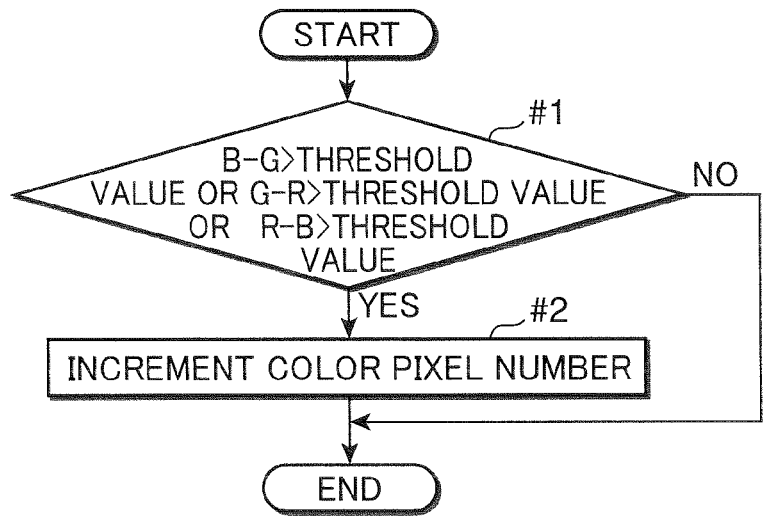
FIG. 3 is a flow chart showing an ACS process.

The ACS processor 35 first performs a process as shown in FIG. 3 for each pixel. Specifically, if R, G, B denote a pixel value of R (red) components of the pixel, that of G (green) components and that of B (blue) components, the ACS processor 35 judges whether or not at least one of a condition that a difference between the pixel values B and G is larger than a predetermined threshold value, a condition that a difference between the pixel values G and R is larger than a predetermined threshold value and a condition that a difference between the pixel values R and B is larger than a predetermined threshold value is satisfied for each pixel, and judges that this pixel is a color pixel and increments the count value of the color pixels by one (Step #2) if at least any one of the respective conditions is satisfied (YES in Step #1).

Figure 4:
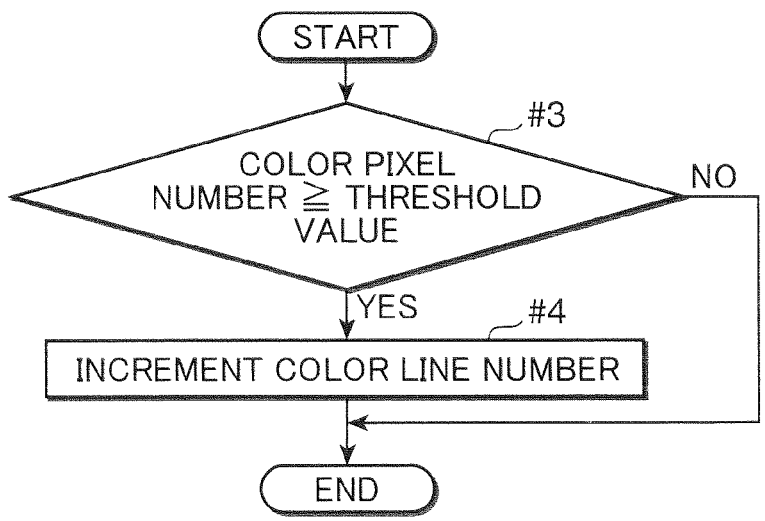
FIG. 4 is a flow chart showing the ACS process.

When the process shown in FIG. 3 is finished for each pixel, the ACS processor 35 pays attention to the respective pixel lines (pixel rows) and judges whether or not the number of color pixels belonging to the pixel line is equal to or larger than a predetermined threshold value for each pixel line as shown in FIG. 4 (Step #3). If the number of the color pixels belonging to the pixel line is equal to or larger than the predetermined threshold value (YES in Step #3), the count value is incremented by 1 upon judging that the pixel line is a color pixel line (Step #4).

Figure 5:
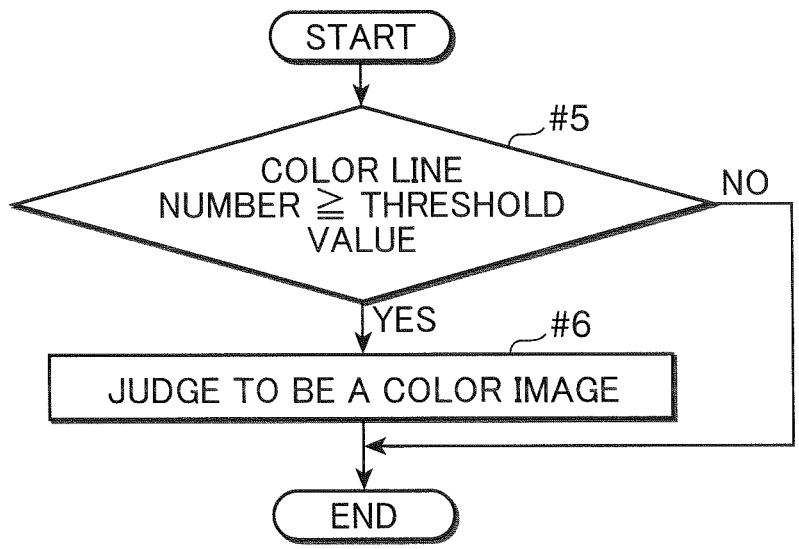
FIG. 5 is a flow chart showing the ACS process.

When the process shown in FIG. 4 is finished for each pixel line, the ACS processor 35 judges whether or not the count value of the color pixel lines in the image is equal to or larger than a predetermined threshold value as shown in FIG. 5 (Step #5). If the count value of the color pixel lines in the image is equal to or larger than the predetermined threshold value (YES in Step #5), the image is judged to be a color image (Step #6).

The tint block processor 36 corresponds to the tint block detector and includes an R color tint block detector 361, a G color tint block detector 362, a B color tint block detector 363 and a tint block color determiner 364. Here, the tint block is described.

Figure 6A:
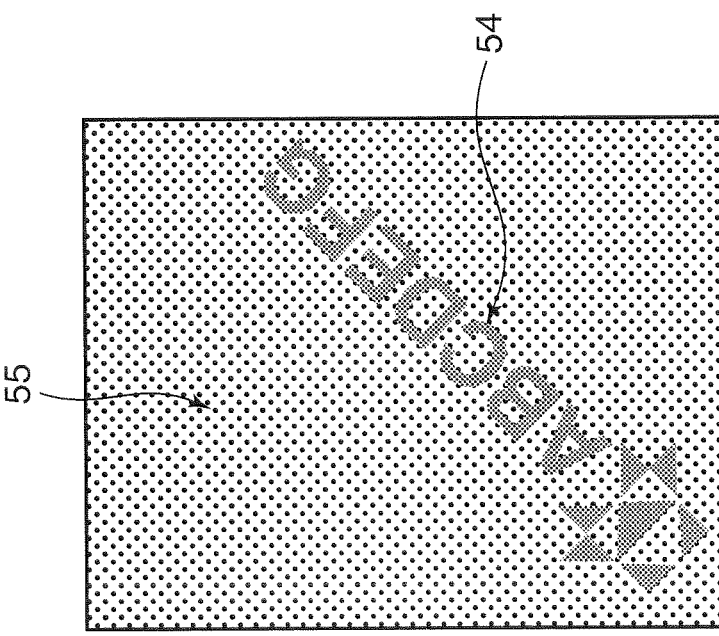
FIG. 6A and FIG. 6B are diagrams showing exemplary tint blocks.
Figure 6B:
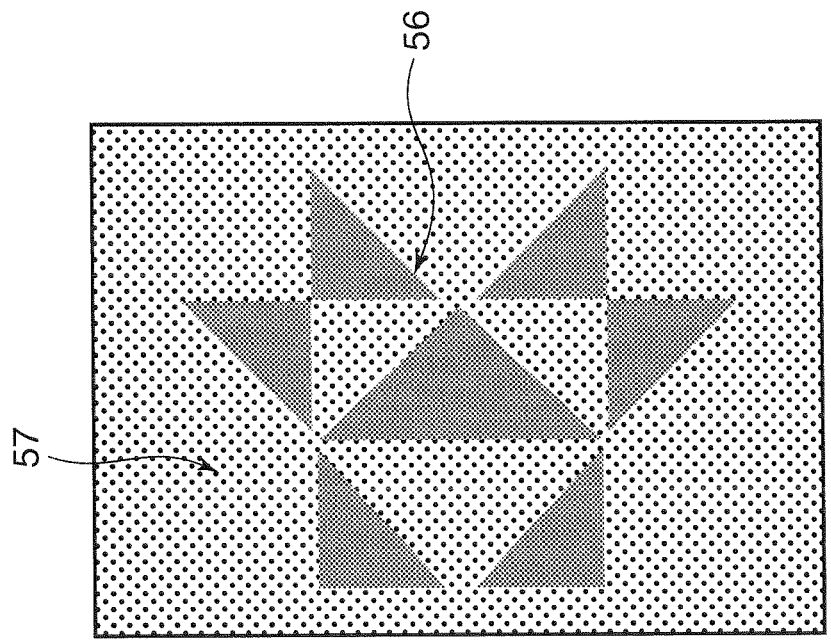

FIGS. 6A and 6B are diagrams showing exemplary tint blocks. The tint blocks include latent image parts 54, 56 and background parts 55, 57 formed by different numbers of screen lines as shown in FIGS. 6A and 6B.

Figure 7A:
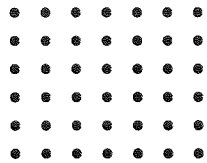
FIG. 7A and FIG. 7B are diagrams showing dot patterns for forming a latent image part and a background part for the formation of a tint block.
Figure 7B:
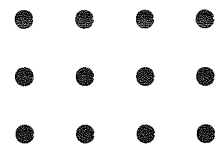

As shown in FIG. 7, the number of screen lines forming the latent image parts 54, 56 (see FIG. 7A) is higher than that of screen lines (halftone dot density) forming the background parts 55, 57 (see FIG. 7B) and the background parts 55, 57 are formed by dots of about such a size (diameter) as to be resolved by a reading operation in general multi functional peripherals including the multi functional peripheral 1, whereas the latent image parts 54, 56 are formed by dots of about such a size (diameter) as not to be resolved by the reading operation in general multi functional peripherals including the multi functional peripheral 1.

Accordingly, when documents formed with these tint blocks are read, parts of the documents corresponding to the latent image parts 54, 56 normally become white and specified patterns visually come up to be seen on copied media. A tint block is formed by dots which differ from those forming an image in an image area in one or more of parameters including the halftone dot size, the halftone dot density, the screen line number and the screen angle.

The R color tint block detector 361 detects whether or not document image data of R (red) color components out of document image data of the respective color components of R (red), G (green) and B (blue) output from the scanner unit 21 includes a specified tint block.

Specifically, the R color tint block detector 361 stores reference data for tint block image data of R (red) beforehand and detects whether or not there is any image data coinciding with the reference data in the document image data of R (red) color components received from the scanner unit 21. More specifically, the R color tint block detector 361 divides the document image data of R (red) color components obtained from the scanner 21 into a plurality of image data, and judges whether or not each divided image data coincides with (or substantially coincides with) the reference data based on whether or not the respective parameter values coincide (substantially coincide). The reference data is such that the respective parameters including the halftone dot size, the halftone dot density, the screen line number and the screen angle are set to predetermined values.

The G color tint block detector 362 detects whether or not document image data of G (green) color components of the document image data of the respective color components of R (red), G (green) and B (blue) output from the scanner unit 21 includes a specified tint block.

Specifically, similar to the detection method of the above R color tint block detector 361, the G color tint block detector 362 stores reference data for tint block image data of G (green) beforehand and detects whether or not there is any image data coinciding with the reference data in the document image data of G (green) color components received from the scanner unit 21. More specifically, the G color tint block detector 362 divides the document image data of G (green) color components obtained from the scanner 21 into a plurality of image data, and judges whether or not each divided image data coincides with (or substantially coincides with) the reference data based on whether or not the respective parameter values coincide (substantially coincide). The reference data is such that the respective parameters including the halftone dot size, the halftone dot density, the screen line number and the screen angle are set to predetermined values.

The B color tint block detector 363 detects whether or not document image data of B (blue) color components out of document image data of the respective color components of R (red), G (green) and B (blue) output from the scanner unit 21 includes a specified tint block.

Specifically, similar to the detection methods of the above R color tint block detector 361 and G color tint block detector 362, the B color tint block detector 363 stores reference data for tint block image data of B (blue) beforehand and detects whether or not there is any image data coinciding with the reference data in the document image data of B (blue) color components received from the scanner unit 21. More specifically, the B color tint block detector 363 divides the document image data of B (blue) color components obtained from the scanner 21 into a plurality of image data, and judges whether or not each divided image data coincides with (or substantially coincides with) the reference data based on whether or not the respective parameter values coincide (substantially coincide). The reference data is such that the respective parameters including the halftone dot size, the halftone dot density, the screen line number and the screen angle are set to predetermined values.

As shown in FIG. 8, if the color of a tint block formed on a document is, for example, K (black), any of tint block data of the respective color components of R (red), G (green) and B (blue) has a small pixel value. If the color of a tint block formed on a document is, for example, R (red), only tint block data of R (red) has a relatively large pixel value and those of G (green) and B (blue) have relatively small pixel values. If the color of a tint block formed on a document is, for example, C (cyan), tint block data of G (green) and B (blue) are relatively large and that of R (red) is relatively small.

In this way, combination patterns of the magnitudes of the pixel values indicated by the respective tint block image data of the respective color components of R (red), G (green) and B (blue) are unique to the colors of tint blocks formed on documents and the combinations patterns and the colors of tint blocks formed on documents correspond.

Here, the sheet of a document is assumed to be white in this embodiment. In this case, tint block image data of R color components has, for example, a large pixel value. If the pixel value of this image data is approximate to the pixel value of image data of the photoelectric conversion elements of R (red) having read the white background part where no image exists, the R color tint block detector 361 cannot distinguish whether the image data of current interest is the tint block image data or the image data indicating the white background part.

Specifically, the R color tint block detector 361 cannot detect the tint block image data of R (red) color components from the document image data of R (red) received from the scanner unit 21 when the pixel value of the tint block image data of R color components is approximate to the pixel value of the image data of the photoelectric conversion elements of R (red) having read the white background part where no image exists. This also holds for the G color tint block detector 362 and the B color tint block detector 363.

Accordingly, in this embodiment, the R color tint block detector 361 detects the tint block image data of R color components using the image data of R (red) with relatively small pixel values excluding the image data approximate to the pixel value of the image data indicating the white background part (using the image data of R (red) with relative small pixel values as a target).

In other words, the R color tint block detector 361 detects whether or not there is any image data having a relatively small pixel value and coinciding with the reference data in the document image data of R (red) color components received from the scanner unit 21.

The R color tint block detector 361 notifies a detection result indicating the detection of the tint block image data of R color components to the tint block color determiner 364 in the case of detecting the presence of the image data having a relatively small pixel value and coinciding with the reference data in the document image data of R (red) color components received from the scanner unit 21 while notifying a detection result indicating no detection of the tint block image data of R color components to the tint block color determiner 364 in other cases, i.e. if image data with a relatively large pixel value is present in the document image data of R (red) color components received from the scanner unit 21. The G color tint block detector 362 and the B color tint block detector 363 also perform processes similar to that of the R color tint block detector 361.

The tint block color determiner 364 determines the presence or absence of the tint block on the document and the color of the tint block based on the respective detection results by the R color tint block detector 361, the G color tint block detector 362 and the B color tint block detector 363.

FIG. 9 is a table showing a relationship of detection results relating to the presence or absence of tint block data of the respective color components by the R color tint block detector 361, the G color tint block detector 362 and the B color tint block detector 363, the presence or absence of the tint block (no distinction between chromatic color and monochromatic color) on the document, and the presence or absence of a chromatic tint block on the document. Here, a total of seven colors, i.e. K (black), R (red), G (green), B (blue), C (cyan), M (magenta) and Y (yellow) are assumed as colors usable for a tint block formed on a document.

In FIG. 9, "1" indicates a case where the presence of the tint block data of the respective color components is judged by the R color tint block detector 361, the G color tint block detector 362 and the B color tint block detector 363, whereas "0" indicates a case where the absence of the tint block of the color components is judged. The tint block is present on the document if the tint block data of at least one of the respective color components of R (red), G (green) and B (blue) is detected and this case is indicated by "1" in FIG. 9. On the other hand, no tint block is present if none of the tint block data of the respective color components of R (red), G (green) and B (blue) is detected and this case is indicated by "0" in FIG. 9.

The chromatic tint block is present on the document in the case of detecting the tint block data of one or two of the respective color components of R (red), G (green) and B (blue) and this case is indicated by "1" in FIG. 9. On the other hand, no chromatic tint block is present and the black tint block is present in the case of detecting the tint block data of all the color components of R (red), G (green) and B (blue) and this case is indicated by "0".

The tint block color determiner 364 stores the table as shown in FIG. 9 beforehand. The tint block color determiner 364 determines the presence or absence of the tint block and the presence or absence of the chromatic tint block based on the respective detection results by the R color tint block detector 361, the G color tint block detector 362 and the B color tint block detector 363 and the above table, and outputs first detection result information indicating the presence or absence of the tint block and second detection result information indicating the presence or absence of the chromatic tint block to the image formation controller 37.

For example, the tint block color determiner 364 outputs the data "1" indicating that the tint block is formed on the document as the first detection result information and the data "0" indicating that this tint block is not a chromatic tint block (the tint block is a black tint block) as the second detection result information based on the table shown in FIG. 9 when the tint block data of the respective color components of R (red), G (green) and B (blue) are judged to be present by the R color tint block detector 361, the G color tint block detector 362 and the B color tint block detector 363.

Further, the tint block color determiner 364 outputs the data "1" indicating that the tint block is formed on the document as the first detection result information and the data "1" indicating that the chromatic tint block is formed on the document as the second detection result information when the tint block data of one or two of the respective color components of R (red), G (green) and B (blue) are judged to be present by the R color tint block detector 361, the G color tint block detector 362 and the B color tint block detector 363.

Furthermore, the tint block color determiner 364 outputs the data "0" indicating that no tint block is formed on the document as the first detection result information and data "0" indicating that no chromatic tint block is formed on the document as the second detection result information when the tint block data of none of the respective color components of R (red), G (green) and B (blue) is judged to be present by the R color tint block detector 361, the G color tint block detector 362 and the B color tint block detector 363.

The image formation controller 37 instructs the image forming section 2 to perform a color image forming operation or a monochromatic image forming operation based on the type of the operation mode (color copy mode/monochromatic copy mode/automatic color determination mode) set by the mode setter 34, the process result by the ACS processor 35 and the first and second detection result information output from the tint block processor 36.

The color image forming operation means an image forming operation for forming an image using at least two of C (cyan), M (magenta), Y (yellow) and K (black) developers used in a predetermined color system (here, CMY color system) on one sheet surface. The monochromatic image forming operation means an image forming operation for forming an image using only one (here, for example, black developer) of the respective developers on one sheet surface.

A specific process of the image formation controller 37 is described. The image formation controller 37 instructs the image forming section 2 to perform an image forming operation in the presently set operation mode (color copy mode or monochromatic copy mode) regardless of the process result by the ACS processor 35 and the first and second detection result information output from the tint block processor 36 if the color copy mode or the monochromatic copy mode is set by the mode setter 34.

Further, the image formation controller 37 performs the following process according to the process result by the ACS processor 35 and the first and second detection result information output from the tint block processor 36 if the automatic color determination mode is set by the mode setter 34.

The image formation controller 37 instructs the image forming section 2 to perform the monochromatic image forming operation as an image forming operation relating to an image of the entire document (image read by the document reader 20 and comprised of an initial image of the document itself and an added tint block image) regardless of the determination result by the ACS processor 35 if the first detection result information received from the tint block color determiner 364 indicates the presence of a tint block and the second detection result information received from the tint block color determiner 364 indicates the presence of a chromatic tint block.

The image formation controller 37 instructs the image forming section 2 to perform an image forming operation corresponding to the determination result by the ACS processor 35 in other cases, i.e. if the first detection result information received from the tint block color determiner 364 indicates the absence of the tint block.

Further, the image formation controller 37 instructs the image forming section 2 to perform an image forming operation corresponding to the determination result by the ACS processor 35 if the first detection result information indicates the presence of the tint block and the second detection result information received from the tint block color determiner 364 indicates the absence of the chromatic tint block.

Figure 10:
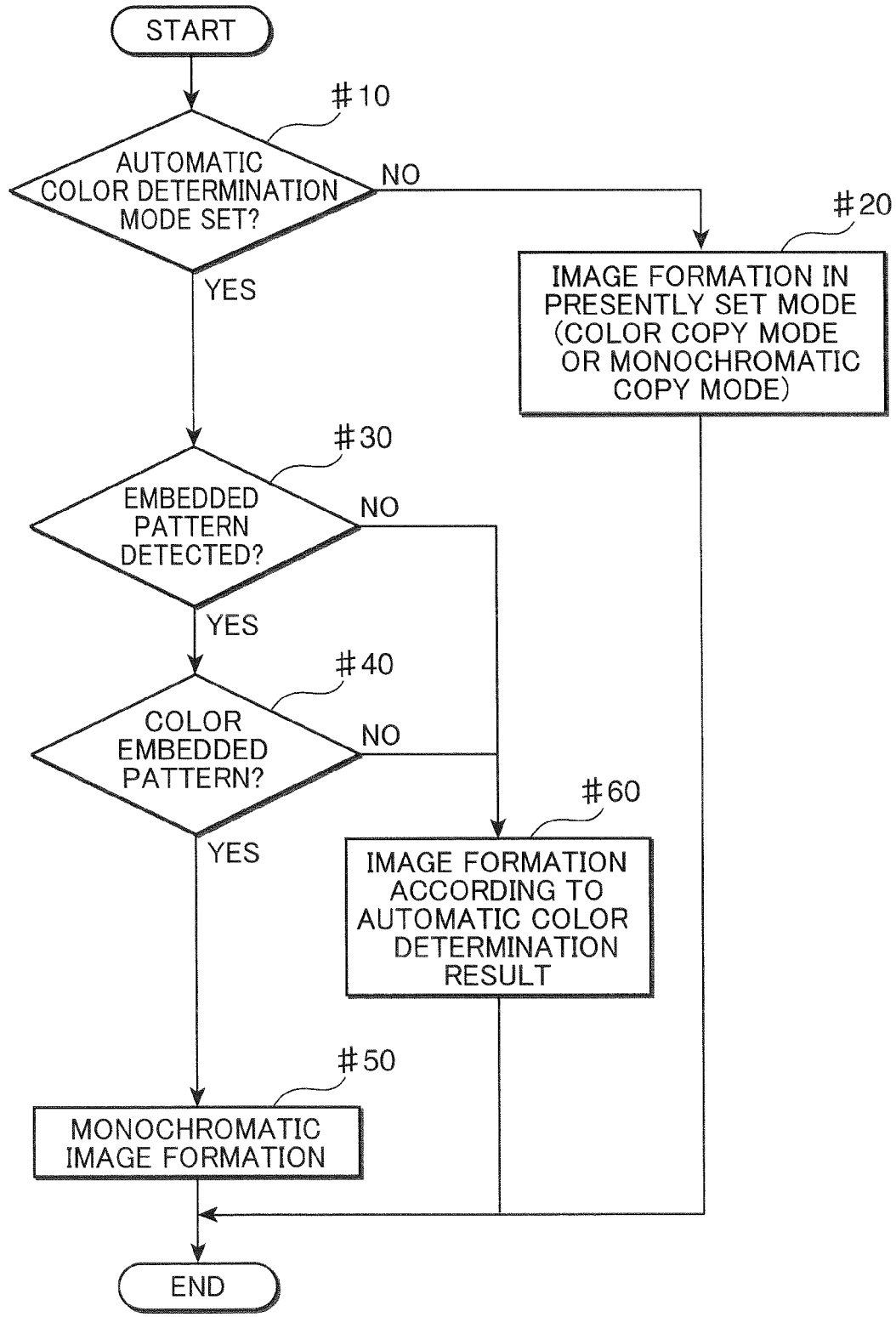
FIG. 10 is a flow chart showing a process by a control unit.

FIG. 10 is a flow chart showing a process by the control unit 33 (image formation controller 37).

As shown in FIG. 10, the image formation controller 37 judges whether or not the automatic color determination mode is set by the mode setter 34 (Step #10). The image formation controller 37 instructs the image forming section 2 to perform an image forming operation in the operation mode (color copy mode/monochromatic copy mode) presently set by the mode setter 34 (Step #20) if the automatic color determination mode is not set by the mode setter 34, i.e. if the color copy mode or the monochromatic copy mode is set by the mode setter (NO in Step #10).

On the other hand, if it is judged that the automatic color determination mode is set by the mode setter 34 in Step #10 (YES in Step #10), the image formation controller 37 judges whether or not a tint block has been detected by the tint block processor 36 based on the first detection result information (Step #30).

If it is detected that the tint block has been detected by the tint block processor 36 (YES in Step #30), the image formation controller 37 judges whether or not a chromatic tint block has been detected based on the second detection result information (Step #40). If it is judged that the tint block is a chromatic tint block (YES in Step #40), the image formation controller 37 causes the image forming section 2 to perform a monochromatic image forming operation using only the black developer as an image forming operation relating to the image of the entire document (Step #50).

On the other hand, if it is judged that no tint block has been detected in Step #30 (NO in Step #30) and if it is judged that no chromatic tint block has been detected in Step #40 (NO in Step #40), the image formation controller 37 causes the image forming section 2 to perform an image forming operation corresponding to the determination result by the ACS processor 35 (Step #60).

As described above, in this embodiment, even if it is detected by the ACS processor 35 that a chromatic tint block is formed in the background of an original image such as a text, the image formation controller 37 executes a monochromatic image forming operation as an image forming operation relating to the image of the entire document regardless of the determination result by the ACS processor 35. Thus, the image formation controller 37 does not execute a color image forming operation if the document is determined to be a color document by the ACS processor 35 due to the tint block in a mixed color of the colors of at least two developers even though the original document image such as a text is monochromatic. Therefore, the number of the colors of the developers used can be suppressed as compared with the case where the color image forming operation is performed due to a tint block in the mixed color of the colors of at least two developers even though the document image is monochromatic. As a result, it is possible to reduce the consumption of the developers and prevent or suppress the waste of the developers. Further, since it is sufficient to cause the operation of only the single image forming unit relating to the formation of a monochromatic image, energy can be saved as compared with the case of forming a color image (at least two image forming units need to be operated).

In the present invention, the following modifications can be also adopted in place of or in addition to the above embodiment.

Modification [1]

Although a monochromatic image forming operation is performed as an image forming operation relating to an image of an entire document regardless of the determination result by the ACS processor 35 when a chromatic tint block is formed in the background of the document image in the first embodiment, the consumption of the developers required for the tint block can be reduced if the image formation controller 37 executes the monochromatic image forming operation as an image forming operation relating to an image of the tint block.

In this case, for the original document image such as a text, the image formation controller 37 may discriminate whether to execute a color image forming operation or to execute a monochromatic image forming operation in accordance with the determination result by the ACS processor 35.

Modification [2]

In a modification [2], a monochromatic image forming operation is performed as an image forming operation relating to an image of a tint block regardless of the determination result by the ACS processor 35 similar to the above modification [1], but the monochromatic image forming operation is not limited to the one using the black developer and a monochromatic image forming operation using a single developer other than the black developer is performed in a modification [2].

According to these modifications [1] and [2], the following effects are exhibited.

For example, in the first embodiment, a monochromatic image forming operation is performed as an image forming operation relating to an entire image of a document even when a document image is chromatic and a tint block is black. Specifically, if the color of the developer used for the image forming operation relating to the image of the tint block is not limited to black, the image formation controller 37 executes a monochromatic image forming operation using only the developer of one color as an image forming operation relating to an entire image of a document even if the color of a tint block image is black and a document with an image in a chromatic color, e.g. magenta is to be copied. In this case, there is a possibility that the entire image including the tint block formed on the sheet chromatically relatively differs from the document image.

On the contrary, according to the modifications [1] and [2], it is possible to reduce the consumption of the developers required for the image formation of a tint block while forming the above original document image such as a text in the same color as the original document.

Modification [3]

In the first embodiment and the modifications [1] and [2], whether or not the tint block is chromatic is detected when the tint block processor 36 detects the tint block, and the image formation controller 37 determines whether to execute a monochromatic image forming operation using only the black developer or to execute a color image forming operation based on the detection result. However, in a modification [3], the image formation controller 37 executes a monochromatic image forming operation regardless of the color of the tint block if the tint block is detected as shown in FIG. 11.

FIG. 11 is a flow chart showing a modification of the process by the control unit 33.

As shown in FIG. 11, the image formation controller 37 judges whether or not the multi functional peripheral 1 is set in the automatic color determination mode (Step #11). If judging that the automatic color determination mode is not set by the mode setter 34, i.e. the color copy mode or the monochromatic copy mode is set by the mode setter 34 (NO in Step #11), the image formation controller 37 causes the image forming section 2 to perform an image forming operation in the operation mode (color copy mode or monochromatic copy mode) presently set by the mode setter 34 (Step #12).

On the other hand, if judging that the automatic color determination mode is set by the mode setter 34 in Step #11 (YES in Step #11), the image formation controller 37 judges whether or not a tint block has been detected by the tint block processor 36 based on the first detection result information (Step #13).

If judging that the tint block has been detected by the tint block processor 36 (YES in Step #13), the image formation controller 37 causes the image forming section 2 to perform a monochromatic image forming operation as an image forming operation relating to an image of an entire document (Step #14). On the other hand, if judging that no tint block has been detected in Step #13 (NO in Step #13), the image formation controller 37 causes the image forming section 2 to perform an image forming operation corresponding to the determination result by the ACS processor 35 (Step #15).

Also by this process, it is possible to reduce the consumption of the developers and to prevent or suppress the waste of the developers as compared with the case where a color image forming operation is performed when a document is determined to be a color document by the ACS processor 35.

This modification [3] obviates the need for the tint block color determiner 364 for detecting the color of the tint block based on the image data unlike the first embodiment and the modifications [1] and [2] and a cost increase and the complexity of the processes can be suppressed by that much.

Modification [4]

In the modification [3], when a tint block is formed in the background of a document image, a monochromatic image forming operation is performed as an image forming operation relating to an image of an entire document regardless of the color of the tint block and the determination result by the ACS processor 35. However, a modification [4] performs at least the monochromatic image forming operation as an image forming operation relating to a tint block image from the same perspective as the modification [1]. Thus, the modification [4] at least reduces the consumption of the developers required to form a tint block image.

In this case, the image formation controller 37 may execute a color image forming operation or a monochromatic image forming operation for the original document image such as a text in accordance with the determination result by the ACS processor 35. This enables a reduction in the consumption of the developers required for the image formation of a tint block while enabling the formation of the original document image such as a text in the same color as the original document.

Modification [5]

In a modification [5], a monochromatic image forming operation is performed as an image forming operation relating to a tint block image regardless of the determination result by the ACS processor 35 similar to the above modification [4]. However, at the time of this monochromatic image forming operation, the monochromatic image forming operation is performed using a single developer other than the black developer without being limited to a monochromatic image forming operation using the black developer in the modification [5].

The modifications [4] and [5] have the following effects.

For example, in the modification [3], a monochromatic image forming operation is performed as an image forming operation relating to an entire image of a document even when a document image is chromatic and a tint block is black. In other words, if it is assumed that the color of the developer used for an image forming operation relating to a tint block image is not limited to black, the image formation controller 37 executes a monochromatic image forming operation using the developer of only one color as an image forming operation relating to an entire image of a document even if the color of a tint block image is black and a document with an image in a chromatic color, e.g. magenta is to be copied in the modification [3]. In this case, there is a possibility that the entire image including the tint block formed on a sheet chromatically relatively differs from the document image.

On the contrary, according to the modifications [4] and [5], it is possible to reduce the consumption of the developers required for the image formation of a tint block while forming the above original document image such as a text in the same color as the original document.

Modification [6]

In a modification [6], the multi functional peripheral 1 incorporating the ACS processor 35 may have a mode for performing the monochromatic image forming operation when a chromatic tint block is formed on a document even if an original document image is determined to be colored by the ACS process as in the first embodiment and the modifications [1] and [2] and a mode for performing the monochromatic image forming operation regardless of whether the color of a tint block is black or chromatic when the tint block is formed on a document as in the modifications [3] to [5], and these modes are made selectable by a user.

Modification [7]

In an modification [7], a monochromatic image forming operation is performed for an original document image and a tint block using the developer of one color other than black prepared in the multi functional peripheral 1, e.g. any one of CMY developers without being limited to the black developer even when the original document image such as a text is determined to be formed by the black developer in the automatic color determination mode and the tint block is determined to be formed in a chromatic color different from black by the tint block color determiner 364 in the first embodiment and the modifications [1] to [6]. This modification [7] can also prevent the waste of the developers similar to the first embodiment.

Modification [8]

The ACS process for determining whether or not the document is a color document may be a process for color determination by another method without being limited to the above process. In a modification [8], color determination is performed by this other method.

Modification [9]

In the first embodiment and the modifications [1] and [2], the monochromatic image forming operation is performed as an image forming operation relating to an image of an entire document regardless of the determination result by the ACS processor 35 when a chromatic tint block is detected. Here, a modification [9] is also applied to a multi functional peripheral 1 not including the ACS processor 35 and the automatic color determination mode, but having a developer suppressing mode as described below. In the following description, an assumed document is such that n tint block is formed in a background area of an image formed by the black developer.

The developer suppressing mode is a mode for performing an image forming operation while suppressing the consumption of the developers required for the image forming operation based on the image data more than the consumption of the developer required for the image forming operation based on the same image data in a normal image forming operation. In the multi functional peripheral 1 of the modification [9], the mode switching section 51 functions to switch the mode between the normal image forming mode and the developer suppressing mode as a result of including this developer suppressing mode. Further, the mode setter 34 functions to switch the mode between the normal image forming mode and the developer suppressing mode based on mode information received from the mode switching section 51.

In such a construction, the image formation controller 37 of the modification [9] executes the monochromatic image forming operation as an image forming operation relating to an image of an entire document when the developer suppressing mode is set by the mode setter 34 and the tint block color determiner 364 detected the formation of a chromatic tint block on the document.

FIG. 12 is a flow chart showing another modification of the process by the control unit 33.

As shown in FIG. 12, the image formation controller 37 judges whether or not the multi functional peripheral 1 is set in the developer suppressing mode (Step #21). If judging that the developer suppressing mode is not set by the mode setter 34, i.e. the normal image forming mode is set (NO in Step #21), the image formation controller 37 causes the image forming section 2 to perform an image forming operation in the operation mode (color copy mode or monochromatic copy mode) presently set by the mode setter 34 (Step #25).

On the other hand, if judging that the developer suppressing mode is set by the mode setter 34 in Step #21 (YES in Step #21), the image formation controller 37 judges whether or not a tint block has been detected by the tint block processor 36 based on the first detection result information (Step #22).

If judging that the tint block has been detected by the tint block processor 36 (YES in Step #22), the image formation controller 37 judges whether or not a chromatic tint block has been detected based on the second detection result information (Step #23). If judging that the chromatic tint block has been detected (YES in Step #23), the image formation controller 37 causes the image forming section 2 to perform the monochromatic image forming operation as an image forming operation relating to an image of an entire document (Step #24).

On the other hand, if judging that no tint block has been detected in Step #22 (NO in Step #22) and that no chromatic tint block is formed on the document in Step #23 (the tint block is a monochromatic tint block) (NO in Step #23), the image formation controller 37 causes the image forming section 2 to perform an image forming operation in the operation mode (color copy mode or monochromatic copy mode) presently set by the mode setter 34 (Step #25).

By this process, it is possible to reduce the consumption of the developers and prevent or suppress the waste of the developers as compared with the case where a color image forming operation is performed when a chromatic tint block is detected.

At this time, since the developer suppressing mode is set based on the user's intention to suppress the consumption of the developers, an unfavorable impression is thought to be hardly given to the user by performing the monochromatic image forming operation despite a color document. Therefore, the consumption of the developers can be reduced without almost reducing the convenience of the multi functional peripheral 1.

Modification [10]

In the modification [9], a monochromatic image forming operation is performed as an image forming operation relating to an image of an entire document when a chromatic tint block is formed in the background of a document image in the case of being set the developer suppressing mode by the mode setter 34. However, in a modification [10], the image forming section 2 is caused to perform, based on the detection result by the tint block processor 36, the monochromatic image forming operation as an image forming operation relating to an image of a tint block part indicated by the detection result and an image forming operation in the operation mode (color copy mode or monochromatic copy mode) presently set by the mode setter 34 for an original document image such as a text. By doing so, it is possible to reduce the consumption of the developers required for the image formation of the tint block while forming the original document image such as a text in the same color as the original document.

The following advantages are obtained as compared with the modification [9] in the case of adopting the mode for performing a monochromatic image forming operation as an image forming operation relating to a tint block image and performing an image forming operation relating to a document image in accordance with the color of the document image when the developer suppressing mode is set by the mode setter 34 and a chromatic tint block is formed in the background of the document image as in the modification [10].

In the modification [9], a monochromatic image forming operation is performed as an image forming operation relating to an entire image of a document even when a document image is chromatic and a tint block is black. In other words, in the modification [9], the image formation controller 37 executes the monochromatic image forming operation using only the black developer or using only the developer of one color, e.g. magenta as an image forming operation relating to an entire image of a document even when a color of a tint block image is black and a color of a document is a chromatic color, e.g. magenta is to be copied. In this case, there is a possibility that the entire image including the tint block formed on a sheet chromatically relatively largely differs from the document image.

On the contrary, it is possible to form a tint block image in black and a document image in a chromatic color in the modification [10] for performing a monochromatic image forming operation using only the single developer as an image forming operation relating to the image of the tint block and performing an image forming operation relating to the document image in accordance with the color of the document image when the chromatic tint block is formed in the background of the document image in the case of being set the developer suppressing mode by the mode setter 34. This can be said to enable an image forming operation as true as possible to the document.

Modification [11]

In the modifications [9] and [10], when a tint block was detected by the tint block processor 36 in the case of being set the developer suppressing mode, the tint block color determiner 364 detects whether or not the detected tint block is chromatic and the image formation controller 37 determines whether to execute a monochromatic image forming operation using only the developer of one color or to execute a color image forming operation based on the detection result. On the contrary, in a modification [11], the image formation controller 37 executes a monochromatic image forming operation regardless of the color of a tint block as an image forming operation relating to an entire image of a document as shown in FIG. 13 when the tint block is detected.

FIG. 13 is a flow chart showing still another modification of the process by the control unit 33.

As shown in FIG. 13, the image formation controller 37 judges whether or not the developer suppressing mode is set by the mode setter 34 (Step #31). If judging that the multi functional peripheral 1 is not set in the developer suppressing mode by the mode setter 34, i.e. the normal image forming mode is set (NO in Step #31), the image formation controller 37 causes the image forming section 2 to perform an image forming operation in the operation mode (color copy mode or monochromatic copy mode) presently set by the mode setter 34 (Step #34).

On the other hand, if judging that the developer suppressing mode is set by the mode setter 34 in Step #31 (YES in Step #31), the image formation controller 37 judges whether or not a tint block has been detected by the tint block processor 36 based on the first detection result information (Step #32).

If judging that the tint block has been detected by the tint block processor 36 (YES in Step #32), the image formation controller 37 causes the image forming section 2 to perform the monochromatic image forming operation as an image forming operation relating to an image of an entire document (Step #33).

On the other hand, if judging that no tint block has been detected in Step #32 (NO in Step #32), the image formation controller 37 causes the image forming section 2 to perform an image forming operation in the operation mode (color copy mode or monochromatic copy mode) presently set by the mode setter 34 (Step #34).

Also by this process, the consumption of the developers can be reduced without almost reducing the convenience of the multi functional peripheral 1.

This modification [11] obviates the need for the tint block color determiner 364 for detecting the color of the tint block based on the image data unlike the modifications [9] and [10] and a cost increase and the complexity of the processes can be suppressed by that much.

Modification [12]

In the modification [11], a monochromatic image forming operation is performed as an image forming operation relating to an image of an entire document when a tint block is formed in the background of a document image in the case of being set the developer suppressing mode by the mode setter 34. However, in a modification [12], the monochromatic image forming operation is performed as an image forming operation relating to an image of a tint block and the image formation controller 37 executes a color image forming operation just as indicated by data of a document image read by the document reader 20 for the original document image such as a text. This enables a reduction in the consumption of the developers required for the image formation of a tint block while enabling the formation of the original document image such as a text in the same color as the original document.

The following advantages are obtained as compared with the modification [11] in the case of adopting a mode for performing a monochromatic image forming operation as an image forming operation relating to a tint block and performing an image forming operation relating to a document image in accordance with the color of the document image when a tint block is formed in the background of the document image in the case of being set the developer suppressing mode by the mode setter 34 as in the modification [12].

In the modification [11], a monochromatic image forming operation is performed as an image forming operation relating to an entire image of a document even when a document image is chromatic and a tint block is black. In other words, in the modification [11], the image formation controller 37 executes the monochromatic image forming operation using only the black developer or using only the developer of one color, e.g. magenta as an image forming operation relating to an entire image of a document even when the document having a black tint block image and a chromatic color, e.g. magenta, document image is to be copied. In this case, there is a possibility that the entire image including the tint block formed on a sheet chromatically relatively largely differs from the document image.

On the contrary, it is possible to form a tint block image in black and a document image in a chromatic color in the modification [12] for performing a monochromatic image forming operation using only the single developer as an image forming operation relating to the image of the tint block and performing an image forming operation relating to the document image in accordance with the color of the document image when the chromatic tint block is formed in the background of the document image in the case of being set the developer suppressing mode by the mode setter 34. This can be said to enable an image forming operation as true as possible to the document.

Modification [13]

A modification [13] is a further modification of the modifications [9] to [12] and is such that the multi functional peripheral 1 has a mode for performing the monochromatic image forming operation when a chromatic tint block is formed on a document and a mode for performing the monochromatic image forming operation regardless of the color of a tint block when the tint block is formed on a document and these modes are made selectable by a user.

Modification [14]

In a modification [14], a monochromatic image forming operation is performed for an original document image and a tint block using the developer of one color other than black prepared in the multi functional peripheral 1, e.g. any one of CMY developers without being limited to the black developer even when the original document image such as a text is determined to be formed by the black developer in the automatic color determination mode and the tint block is determined to be formed in a chromatic color different from black by the tint block color determiner 364 in the first embodiment and the modifications [9] to [13]. This modification [14] can also prevent the waste of the developers.

The image forming apparatus of the present application is not limited to the multi functional peripheral and may be a copier or the like.

According to the present invention illustrated in the above respective embodiment and modes, the following effects can be obtained.

For example, there has been conventionally known an image forming apparatus having an automatic color determining function of determining whether a document is a color document formed with an image using developers of a plurality of colors including chromatic color(s) or a monochromatic document formed with an image using only a black developer.

Such an image forming apparatus may possibly recognize a document to be a color document in the case of color determination by the automatic color determining function when the color of a tint block formed on the document is different from the color of a text such as characters or symbols, a picture or the like formed on the document even if the text, the picture or the like is monochromatically expressed (e.g. in black).

Here, the tint block is for psychologically preventing or inhibiting the copying of the document and important information is the text or the like. Accordingly, as long as the text or the like is monochromatically expressed, it is of little significance to copy the tint block using a plurality of developers when the color of the tint block is a mixed color of the colors of at least two out of a plurality of developers provided in the apparatus. In spite of this, tint blocks have been conventionally copied using a plurality of developers.

In the present invention, attention has been paid to the fact that the use of a plurality of developers to copy a tint block in a mixed color of the colors of at least two developers is the waste of the developers and there is a room here for reducing the consumption of the developers since the total consumption of the developers is generally larger in the case of forming an image using a plurality of developers than in the case of forming an image using only the single developer when the same image is formed.

There has been also conventionally known an image forming apparatus having a developer suppressing mode for performing an image forming operation while suppressing the consumption of developers required for the image forming operation of the same image data more than in a normal image forming mode as an operation mode relating to the image forming operation.

In the present invention, attention has been paid to the fact that it cannot be said to be preferable to copy a tint block using a plurality of developers when at least a text or the like is monochromatically expressed since the setting of the developer suppressing mode reflects a user's intention to suppress the used amount of the developers.

According to the present invention, the consumption (or used amount) of the developers can be suppressed based on these points of attention in the case of copying a document formed with a tint block in a mixed color of the colors of at least two of the developers provided in the apparatus.

This application is based on Japanese Patent Application Serial Nos. 2009-024641 and 2010-9936, filed in Japan Patent Office on Feb. 5, 2009 and Jan. 20, 2010 the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus, comprising:
an image reader that reads an image of a document,
a tint block detector that detects whether or not a tint block is formed on the document based on image data obtained by a reading operation of the image reader and that detects the color of the tint block based on the image data when the tint block is detected,
an image forming section including a plurality of developers and adapted to form an image on a recording medium using one or more of the developers based on the image data,
an image formation controller that causes the image forming section to perform a monochromatic image forming operation using a single developer as an image forming operation relating to the tint block when the tint block was detected by the tint block detector, and
a mode setter alternatively setting a normal image forming mode for performing a normal image forming operation by the image forming section and a developer suppressing mode for suppressing the consumption of the developers required for an image forming operation based on the same image data as compared with the normal image forming mode, wherein:
the image formation controller causes the image forming section to perform the monochromatic image forming operation as an image forming operation relating to the entire image of the document when the tint block detector detects the tint block and the color of the tint block detected by the tint block detector is a mixed color of the colors of at least two of the respective developers in the case of being set the developer suppressing mode by the mode setter.

2. An image forming apparatus according to claim 1, wherein:
the image reader reads the image of the document as image data of color components used in a predetermined color system, and
the tint block detector detects the presence or absence of tint block image data of each color component used in the color system based on the image data obtained by the reading operation of the image reader and detects the color of the tint block based on a combination pattern of the color components detected in the tint block image data.

* * * * *